United States Patent [19]

Walker

[11] Patent Number: 4,868,736
[45] Date of Patent: Sep. 19, 1989

[54] CODE OPERATED ACCESS CONTROL SYSTEM FOR ELECTRONIC DATA STORE

[75] Inventor: Robin D. Walker, Glasgow, Scotland

[73] Assignee: Runtime Innovations Limited, Glasgow, Scotland

[21] Appl. No.: 84,010

[22] Filed: Aug. 10, 1987

[30] Foreign Application Priority Data

Aug. 16, 1986 [GB] United Kingdom ............... 8619989

[51] Int. Cl.⁴ .......................................... G06F 12/00
[52] U.S. Cl. .............................................. 364/200
[58] Field of Search ............... 364/200, 300, 900; 360/48; 380/3, 4

[56] References Cited

U.S. PATENT DOCUMENTS

| | | | |
|---|---|---|---|
| 3,609,697 | 9/1971 | Blevins | 340/172.5 |
| 4,120,030 | 10/1978 | Johnstone | 380/4 |
| 4,200,913 | 4/1980 | Kuhar et al. | 364/900 |
| 4,236,217 | 11/1980 | Kennedy | 364/483 |
| 4,253,157 | 2/1981 | Kirschner et al. | 364/900 |
| 4,305,131 | 12/1981 | Best | 364/521 |
| 4,306,289 | 12/1981 | Lumley | 364/200 |
| 4,361,877 | 11/1982 | Dyer et al. | 364/900 |
| 4,433,207 | 2/1984 | Best | 178/22.09 |
| 4,434,464 | 2/1984 | Suzuki et al. | 364/200 |
| 4,442,486 | 4/1984 | Mayer | 364/200 |
| 4,446,519 | 5/1984 | Thomas | 364/300 |
| 4,454,594 | 6/1984 | Heffron et al. | 364/900 |
| 4,458,315 | 7/1984 | Uchenick | 364/200 |
| 4,462,076 | 7/1984 | Smith, III | 364/200 |
| 4,462,078 | 7/1984 | Ross | 364/300 |
| 4,471,163 | 9/1984 | Donald et al. | 178/22.08 |
| 4,494,156 | 1/1985 | Kadison et al. | 360/48 |
| 4,513,174 | 4/1985 | Herman | 178/22.08 |
| 4,528,588 | 7/1985 | Lofberg | 358/122 |
| 4,553,252 | 11/1985 | Egendorf | 377/15 |
| 4,562,306 | 12/1985 | Chou et al. | 178/22.08 |
| 4,562,495 | 12/1985 | Bond et al. | 360/78 |
| 4,577,289 | 3/1986 | Comerford et al. | 364/900 |
| 4,584,641 | 4/1986 | Guglielmino | 364/200 |
| 4,589,064 | 5/1986 | Chiba et al. | 364/200 |
| 4,593,353 | 6/1986 | Pickholtz | 364/200 |
| 4,593,376 | 6/1986 | Volk | 364/900 |
| 4,597,058 | 6/1986 | Izumi et al. | 364/900 |
| 4,634,807 | 1/1987 | Chorley et al. | 178/22.08 |
| 4,644,493 | 2/1987 | Chandra et al. | 364/900 |
| 4,646,234 | 2/1987 | Tolman et al. | 364/200 |
| 4,652,990 | 3/1987 | Pailen et al. | 364/200 |
| 4,658,093 | 4/1987 | Hellman | 380/25 |
| 4,670,857 | 6/1987 | Rackman | 380/4 |
| 4,680,731 | 7/1987 | Izumi et al. | 364/900 |
| 4,683,553 | 7/1987 | Mollier | 380/4 |
| 4,685,056 | 8/1987 | Barnsdale et al. | 364/200 |
| 4,688,169 | 8/1987 | Joshi | 364/200 |
| 4,691,350 | 9/1987 | Kleijne et al. | 380/3 |
| 4,701,846 | 10/1987 | Ikeda et al. | 364/200 |
| 4,713,753 | 12/1987 | Boebert et al. | 364/200 |

FOREIGN PATENT DOCUMENTS

| | | |
|---|---|---|
| 900479 | 12/1984 | Belgium . |
| 084441 | 7/1983 | European Pat. Off. . |
| 135422 | 3/1985 | European Pat. Off. . |
| 57-726 | 4/1982 | Japan . |

*Primary Examiner*—Raulfe B. Zache
*Attorney, Agent, or Firm*—Pennie & Edmonds

[57] ABSTRACT

A system for controlling access such as time access by a user to a store of information in an information storage system which uses unique codes associated with corresponding number of information units. The system includes a key storage unit (18) which is specifically formatted and can only be accessed by a special read/write program available to the distributor or manufacturer. The key storage unit (18) has a plurality of keys (16) which act as addresses for time units which control the time of operation the program is to be run using the host system clock (14). In response to a valid key being given to the user and being entered to start the program, the number of timed units for this code is rendered subsequently inaccessible, by for example being set to zero automatically so that it cannot readily be used again for free. The program can then be run continuously until an accumulated predetermined time is reached and at the end of the time, program operation is terminated. The user can extend operation by obtaining additional keys, subject to payment, to run the program for as long as suitable. With this system the user does not buy the computer program but effectively hires it from the owner or distributor.

18 Claims, 6 Drawing Sheets

CODE OPERATED ACCESS CONTROL SYSTEM FOR ELECTRONIC DATA STORE

BACKGROUND OF THE INVENTION

1. Field of the Invention

The present invention relates to a system for controlling the access to a store of information stored in divisable form in machine readable media using a unique code and particularly, but not exclusively, is suitable for controlling the length of time a computer program is used. The system can also be used to control the length of time a piece of hardware, such as a VCR or computer is used.

2. Description of the Related Art

Computer programs require considerable effort to create and debugg, particularly those for use in engineering projects and the like. Such programs are invariably specialised and are expensive to create and to buy. Many potential users are deterred by the price because they may require to use the program infrequently and find it difficult to justify the relatively high purchase cost. This means that many projects are limited in the number of complexity of data processing power and handling which can be handled by such programs. Another factor deterring purchase is that programs are being continuously improved so that the risk of having an obsolete expensive program is of considerable concern.

An object of the present invention is to provide a system which obviates or mitigates the aforesaid disadvantages.

SUMMARY OF THE INVENTION

This is achieved by incorporating a system in each program which uses codes to control and monitor the access by a user to a store of information units, for example if the units are time, the length of time the program is run by the host operating system is controlled.

The program is provided to a user who wishes to run the program for a predetermined time. The user pays for this time and in return receives a special key or code which the user enters into the system. The system includes a key storage unit which is specially formatted and cannot be read by the host device or system, and can only be accessed by a special read/write program available to the distributor or manufacturer. The key storage unit has a plurality of keys which act as addresses for time units which control the time of operation the program is to be run using the host system clock. In response to a valid key being given to the user and being entered to start the program, the number of timed units for this code is rendered subsequently inaccessible, by for example being set to zero automatically so that it cannot readily be used again for free. The program can then be run continuously until a cumulated predetermined time is reached and at the end of the time the program operation is terminated.

The user can extend operation by obtaining additional keys, subject to payment, to run the program for as long as suitable. With this system the user does not necessarily have to buy the computer program but could effectively hires it from the owner or distributor.

In one embodiment of the invention the key storage unit is a floppy diskette having at least one specially formatted track, with 9 numbered segments. Each segment can have 128 pairs of numbers consisting of a code or key number which acts as an address and a corresponding data pocket in the form of time units. The time units can be the same or different. In another embodiment the key storage unit can be an optical disk or programmable chip, or hard disk or laser card or other smart card.

Accordingly in one aspect of the present invention there is provided a control system for controlling access by a host operating system to a store of information stored in divisable form in machine readable media using a unique code, said control system comprising, storage means for storing a plurality of unique codes and corresponding information units, said storage means being normally unreadable by the host operating system, said storage means being coupled to said host operating system via a control device and a unique code obtainable by a user, said host operating system having code input means for entering said code into said storage means via said control device, said unique code allowing use of a number of information units stored in said storage means, the number of information units used being monitored by an information units counter of said host operating system, and comparison means for comparing the number of units used with an available total number of units for that unique code to permit continued access to said store of information for said corresponding information units, and security means coupled to said storage means for causing the number of information units corresponding to said unique code rendered subsequently inaccessible by said unique code or previously used codes after all said corresponding units have been released.

Preferably said units are rendered subsequently inaccessible by setting said number of units corresponding to said unique code to be set to zero.

Conveniently said information units are units of time and said information unit counter is a time clock.

Preferably said storage means if a magnetic disk having a specially formatted track thereon, said track having at least one segment having a plurality of pairs of codes and corresponding time units. Conveniently there are nine segments on the track with each track having 128 pairs of codes and corresponding time units.

Preferably also said control device is a computer and the code input means to the control device is a keyboard. The storage means can be a Winchester disk, floppy disk or any other suitable device.

Accordingly in another aspect of the present invention there is provided a method of controlling access by a host operating system to a store of information stored in divisable form in machine readable media using a unique code said method comprising the steps of, providing a storage means having a plurality of unique codes each with a corresponding number of information units, coupling said storage means to said host operating system, providing a unique code for entry into said host operating system, said unique code being identifiable by said storage means, releasing an information unit corresponding to said code, monitoring a counter of said host operating system, and comparing the elapsed units of codes and corresponding time units. Conveniently there are nine segments on the track with each track having 128 pairs of codes and corresponding time units.

Preferably also said control device is a computer and the interface to the control device is a keyboard. The storage means can be a Winchester disk, floppy disk or any other suitable device.

Accordingly in another aspect of the present invention there is provided a method of controlling access by a host operating system to a store of information stored in divisable form in machine readable media using a unique code said method comprising the steps of, providing a storage means having a plurality of unique codes each with a corresponding number of information units, coupling said storage means to said host operating system, providing a unique code for entry into said host operating system, said unique code being identifiable by said storage means, releasing an information unit corresponding to said code, monitoring a counter of said host operating system, and comparing a counter number of released units with a number of available information units permitting access to said store of information for said corresponding number of information units and after releasing said number of information units, rendering the number of information units corresponding to said code to be inaccessible.

Preferably said number of information units is rendered inaccessible by setting the number to zero after they have been released by said code.

Preferably said method includes the step of entering said code into said host operating system via a keyboard.

Preferably also, said method includes the step of receiving an additional code corresponding to an additional time unit for increasing a period of time for which a computer program is used.

According to another aspect of the invention there is provided a storage device for use with a control system for controlling access by a host operating system to a store of information stored in divisable form in a machine readable media using a unique code, said storage means comprising a storage element having at least one specially formatted area which is unreadable by the host operating system, said area having at least one portion with a plurality of pairs of numbers, each pair having a unique code and a corresponding number of information units, said unique code identifying, when selected, the corresponding number of information units for controlling a counter coupled to the host system to operate until a count corresponding to said number of information units has elapsed.

Preferably, said storage element is a computer disk having a specially formatted track having at least one segment with pairs of numbers therein, said number of information units being stored in time units.

BRIEF DESCRIPTION OF THE DRAWINGS

These and other aspects of the invention will become apparent from the following description when taken in combination with the accompanying drawings in which.

DETAILED DESCRIPTION OF THE PREFERRED EMBODIMENT

Figure 1:
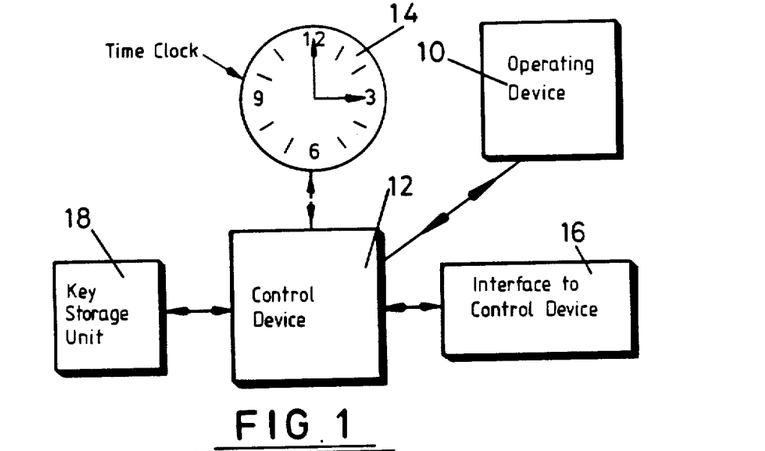
FIG. 1 is a block diagram of a system according to an embodiment of the invention.

Reference is first made to FIG. 1 of the drawings which shows a control system in accordance with an embodiment of the invention. The system comprises an operating device 10, typically computer running an application program, which is coupled to a control device 12, typically a programmed computer. The control device 12 is able to read time clock 14 which allows the control device to monitor the run time of the operating device 10. The control device 10 is connected to an interface 16, which is typically a keyboard or VDU, and to a key storage means 18 in the form of a floppy disk 20, as best seen in FIG. 2, in which coded time sequences are stored for controlling The accumulated run time the application program is used, as will be later described in detail.

Figure 2:
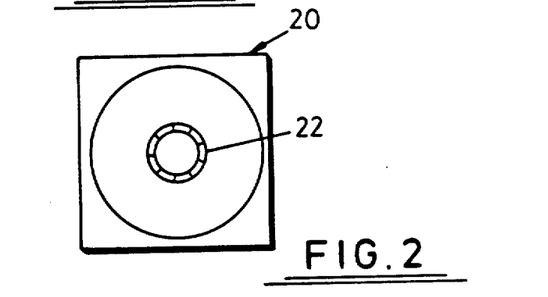
FIG. 2 is a detailed view of the storage unit of FIG. 1.
Figure 3:
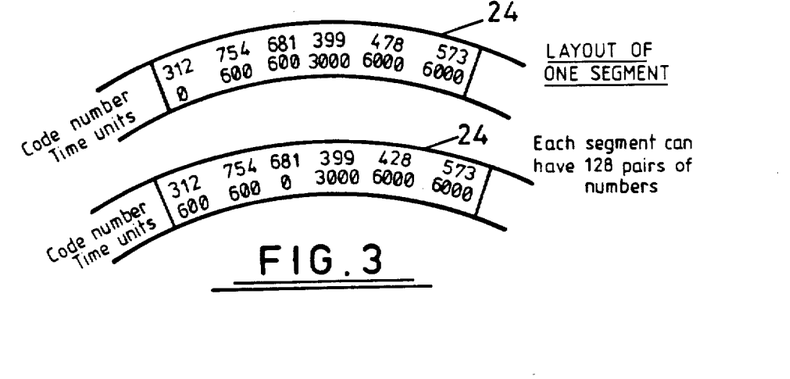
FIG. 3 is an enlarged view of a segment of the track shown in FIG. 2.

Reference is now made to FIG. 2 of the drawings which shows disk 20 which has a specially formatted track 22. The formatting is performed using a special read/write program and cannot be read by the host operating system As seen in FIG. 3 the track 80 contains 9 segments 24, each segment 24 of which contains 128 pairs of numbers. One number in each pair is a code and the other number is a number of time units. The number of time units may be the same or different for each code. The codes cannot be read by the user and are only provided by the owner on payment of a certain amount. Once a code is provided to the user and the code is entered, for example #681, the time unit number is transferred to the first code #312 and the number of units corresponding to #681 is set to zero. Only the time units (600) corresponding to code #312 can be used. This prevents the same code #612 from being used to repeatedly access time units.

Figure 4:
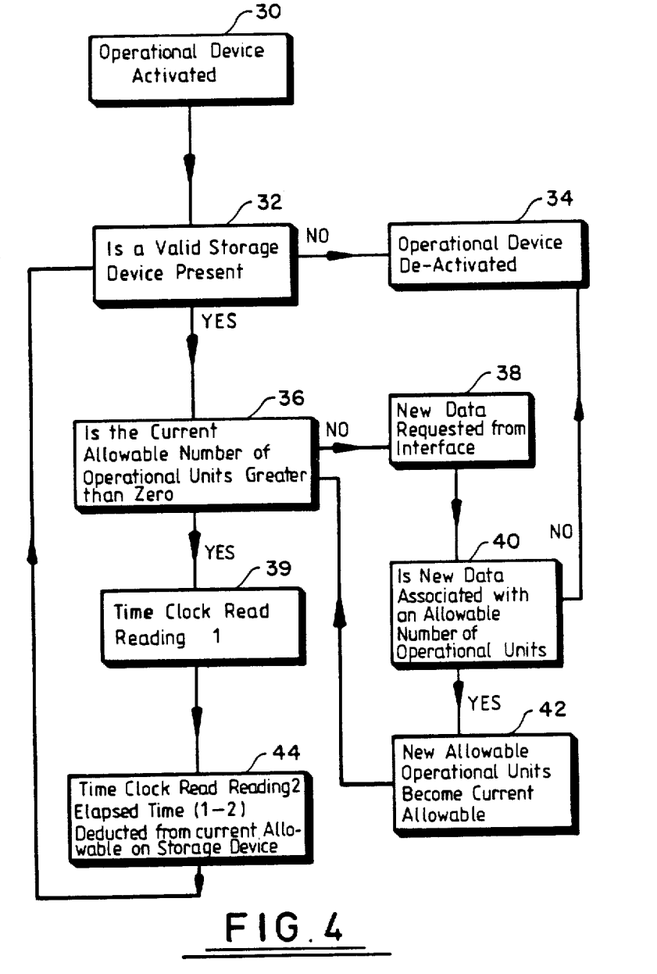
FIG. 4 is a general block diagram of the time control sequence of a computer program.

The operational sequence of the arrangement depicts in FIGS. 1-3 is best seen in the block diagram of FIG. 4. At the beginning of the operation, the controlling device 12 requests the matching of a data unit of one stored in an area of the key storage unit 18 to ensure that a valid storage device 18 is present. If a match is not made then the controlled device denies further use of the operational unit. If that is found then the device accesses an area of the storage unit containing current allowable operational time. If this time is found to be greater than zero 36, then operation is allowed until the time becomes zero or the device operation is terminated by external means, for example, switching the machine off or removing the floppy disk 20. If this current allowable time is zero or less, then the controlling device requests the user to provide a new alphanumeric data unit 38 via the interface 16. This new data is checked with others on the storage device until a match is found, or all data has been checked without a match being found 40. If no match is found the operational device is de-activated 34, but if a match is found then the allowable time associated with the data unit 42 is transferred to the allowable time location in the storage device and the allowable time at the location associated with the particular unit is made zero to prevent subsequent use of the data unit when the new current allowable time becomes zero, and a further alphanumeric data unit is requested via the interface. This procedure is explained above with reference to codes 681 and 312.

At intervals during the operation of the operational device, the control device 12 notes the lapsed operational time between the storing and the most recent noting during current operational period, and deducts this lapsed time from the current allowable time from the storage device 44. At intervals during the operation of the operational device 10, control device 12 also performs a matching operation to ensure that the valid storage 18 remains present. If, for any reason, the valid storage unit 18 has been removed or disconnected then further operation of the operational device 10 is prevented.

It will be appreciated that storage unit 18, operational device 10, control device 12, clock 14 and interface 16 can be interlinked by electrical, optical, r.f. or other signal carrying means.

Figure 5:
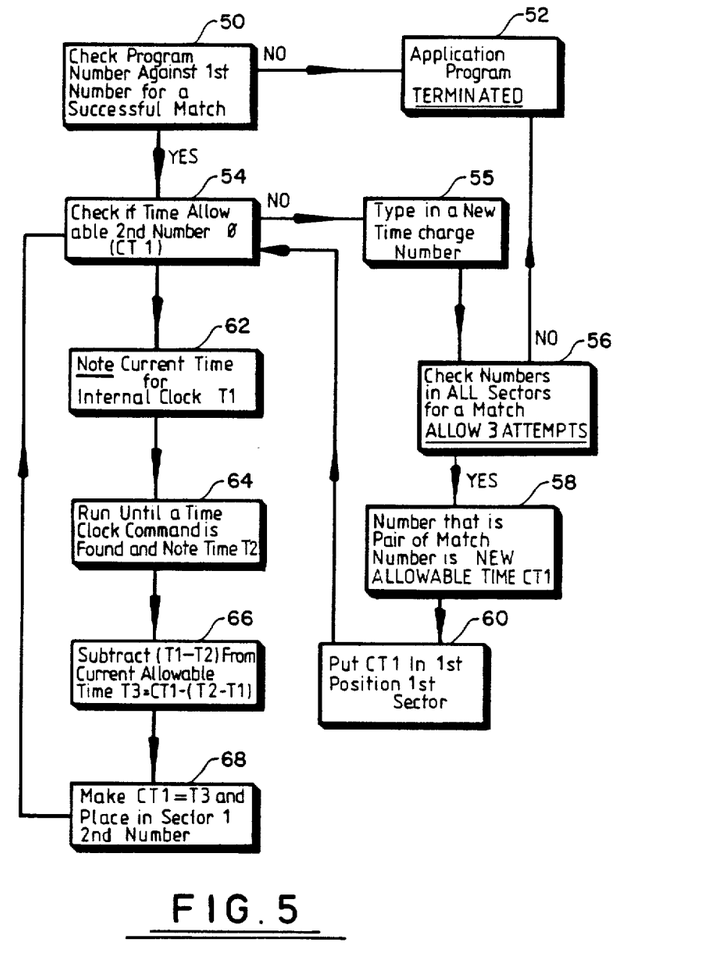
FIG. 5 is a block diagram of a time-control segment of a computer program for a specific application.

Reference is now made to FIG. 5 of the drawings which is similar to FIG. 4 except that this drawing is a block diagram of a particular application using the system to log operation time on a micro-computer operating under the MS-DOS system, utilising as a unit 18 as a key storage device logging the new time of an application program. In this application the storage device 20 has 9 segments 24 in the specially formatted track 22 and each of these sectors as explained above contains up to 128 pairs of numbers. As explained, the first number in the sector is a matching security number of a code to ensure that the security diskette is valid and the second number is the current allowable new time in minutes for running the particular program. It will be seen that the remaining numbers can be paired off with the key number and its associated run timed in minutes. In this case the program number is checked against the first number for a successful match 50 and if a match is not found the application program is terminated 52. If a match is found the system then checks if the time allowable 54, which is the second number greater than zero, and if not a new number is typed in 55 and all number sectors are checked for a new match. Three attempts are permitted 56 and if no match is found after three attempts the program is terminated 52. If a match is found the number that is pair matched becomes the new allowable time CT1 58 and this is put in the first position in the first sector as explained above 60. The current time for the internal clock T1 is then noted 62 and the program is run until a time clock command is found and this becomes time T2 64. T2 is subtracted from T1 (T1−T2) to obtain a time T3 66 and this is placed in the sector at the second number and this is looped back in the program 68 so that the check is again carried out to see if the time allowable in the second number is greater than zero 54 and this operation continues until the time is equal to or less than zero at which time the application program will become terminated 54.

With this arrangement it will be appreciated that there is provided a convenient and elegant process for ensuring that the computer programs are run efficiently and as often as required. The owner provides the program which may be expensive and complex to the user who then enters it into a system but cannot run it until he obtains a particular code corresponding to time of use of the program from the owner or the distributor. Once this code is obtained and entered then according to the above sequence the program runs and reruns for a predetermined cumulative time depending on the amount of value of the time paid for. At the end of this time further requests can be initiated for additional time and if no such codes are entered then the program will terminate. There is no way of re-running the program to obtain 'free' program time and further codes must be obtained from the owner. The special reformatting of the disk track renders it transparent to the operating system of the host computer so that codes are virtually unreadable to ensure security. This system is attractive in that purchase of large and expensive, perhaps unnecessary, programs is obviated and users are able to obtain use of up-to-date programs in an economical and efficient manner and furthermore they are able to tailor the use of the program to their own system as required and merely pay for what they use. They are not limited by having to spend a considerable amount of money on programs which may become obsolete in two or three months.

Figure 6:
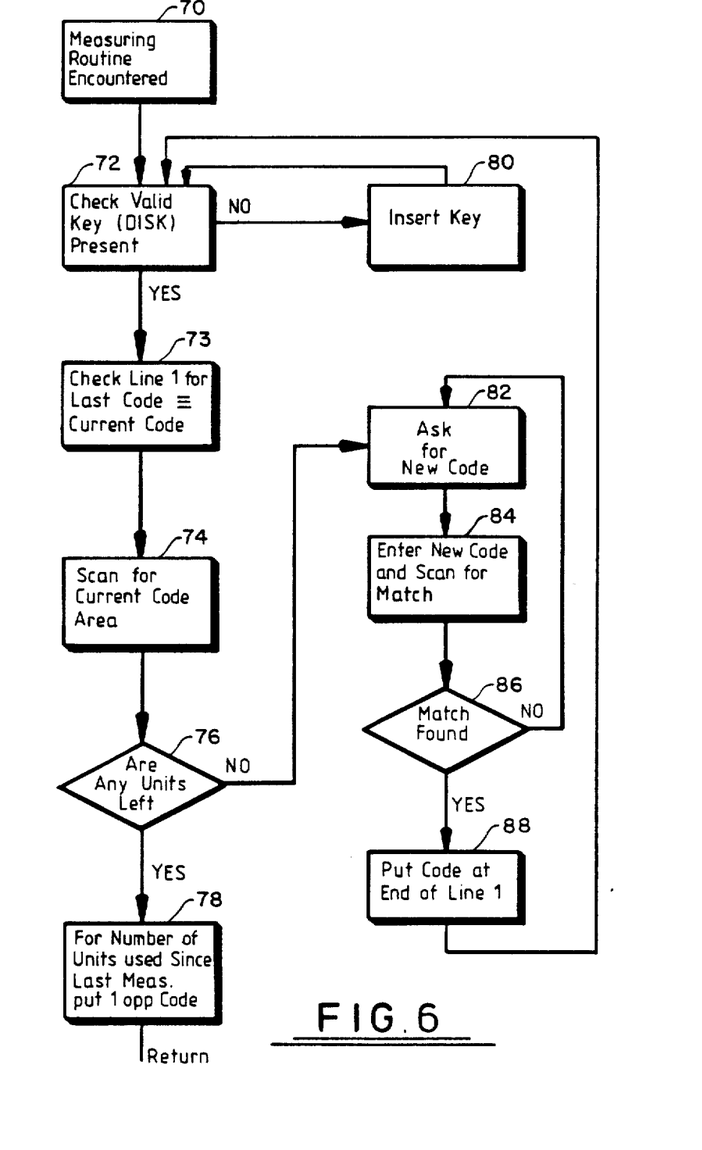
FIG. 6 is a block diagram of a control sequence of a system applied to a write-once read many times media in accordance with the present invention.
Figure 7:
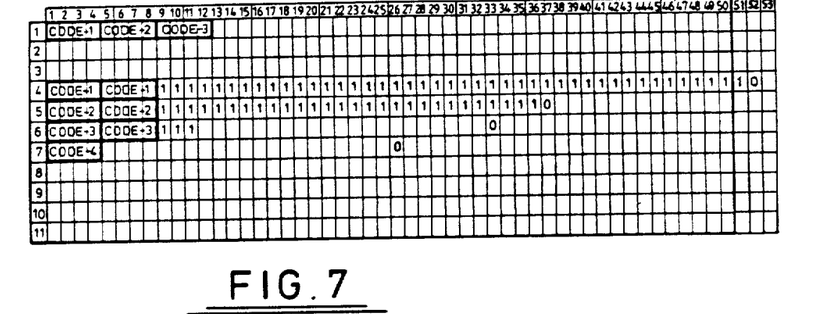
FIG. 7 is a schematic diagram of a portion of a media layout used with the arrangement shown in FIG. 6.

Reference is made to FIGS. 6 and 7 which relates to a further application and embodiment of the system according to the invention. In this application the media is one containing a plurality of codes which can be written on once only known as WORM (write-once read many times) such as an optical disk or laser card or the like in contrast to a magnetic standard floppy disk.

The layout of information on the media is best seen in FIG. 7. Each code, code 1,2,3 etc. has one adjacent space for permitting the code to be repeated, and also a plurality of predetermined spaces "in the same line" to record the number of uses of the code, indicated by '1'. The number of uses is terminated by a '0'. Also a line (line 1) contains spaces reserved for current codes and also a list of codes previously used.

Line 1 shows that the code currently in use is code 3 and this has been used, according to line 6, 3 times out of a possible 32 times. Lines 4 and 5 show that the units available in association with code 1 and code 2 have been fully utilised.

With reference to FIG. 6 the system operates by checking if a valid key device e.g. disk, laser card is present 72 and then line 1 is scanned for the last code used which is deemed to be the current code 73. The current code area is then scanned i.e. code 3 in line 6 to check if any units remain 76. If units remain, and are used, line 6 is updated with a '1'code. If no units remain i.e. a '0'is present, then a new code is requested 82 and checked for a match. If a match is found the valid 'key' presence is checked 72. If not the process is repeated for a preset number of times before a 'corrput key' signal is created.

With this application, because of the medium used, code duplication is used instead of erasing the codes as aforedescribed, to control access, although a further modification is to permit the same code to be used a preset number of times. This is, in the broadest sense, a code used once is repeated and can be preset for 1 use only. No further access to information from this code will be permitted providing the same security effect as with the aforedescribed code erasure system.

Figure 8:
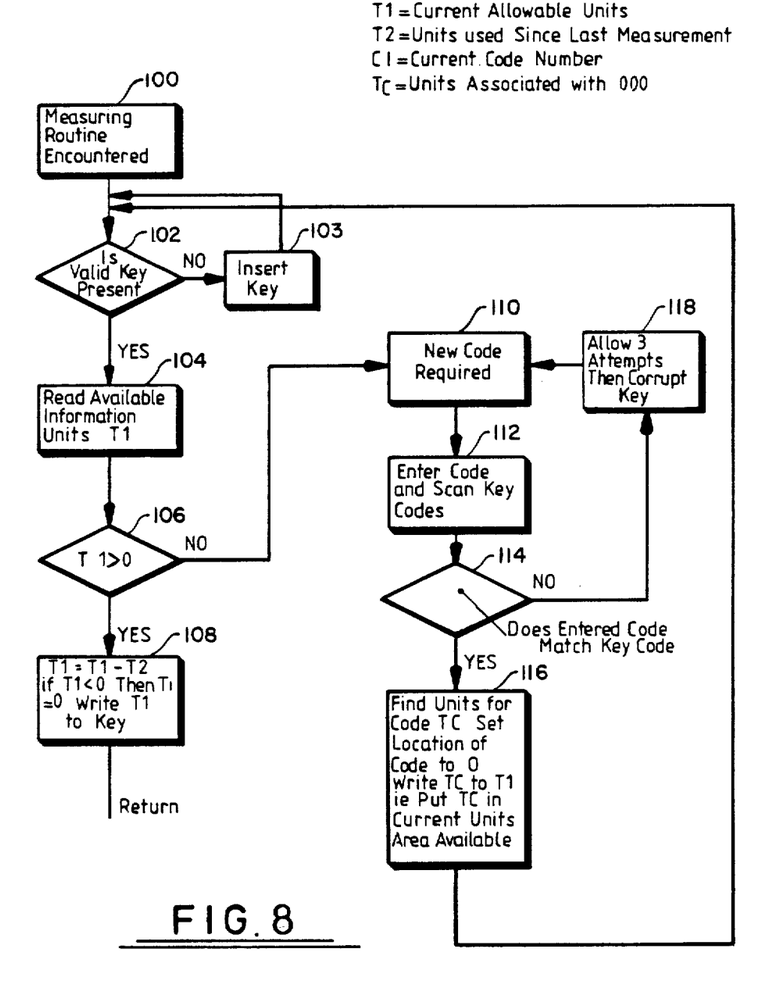
FIG. 8 is a block diagram similar to FIG. 6 but used with an erasable media, and FIG. 9. is a schematic representation of a system in accordance with the invention used with a satellite information transmission system.

Reference is now also made to FIG. 8 of the drawings which is similar to FIG. 6 except that the media is erasable. This can be operated as for code duplication or with code erasure to permit access control to information. The system operates, after having ascertained that a valid key is present, by reading the available units T1 104, if the units satisfies the test T1>0 106 then T1 is written to the key 108. If T1<0 a new code is required 110 and is entered 112 until a match is found 114, whereupon the units associated with code Tc are located and the location of the code set to zero 116. Tc is written into T1, that is Tc is written into the current available units area. If no match is found after three attempts then a corrupt key is actuated 118.

It will be appreciated that various modifications may be made to the system hereinbefore described without departing from the scope of the invention. For example, it will be appreciated that any suitable storage means may be used to obtain the codes and the system is not solely for application for running computer programs. It could be used to control hardware such as computers per se or VCR units in which case obtaining a code and entering it would permit the VCR to run for a fixed time, for example 24 to 48 hours.

Figure 9:
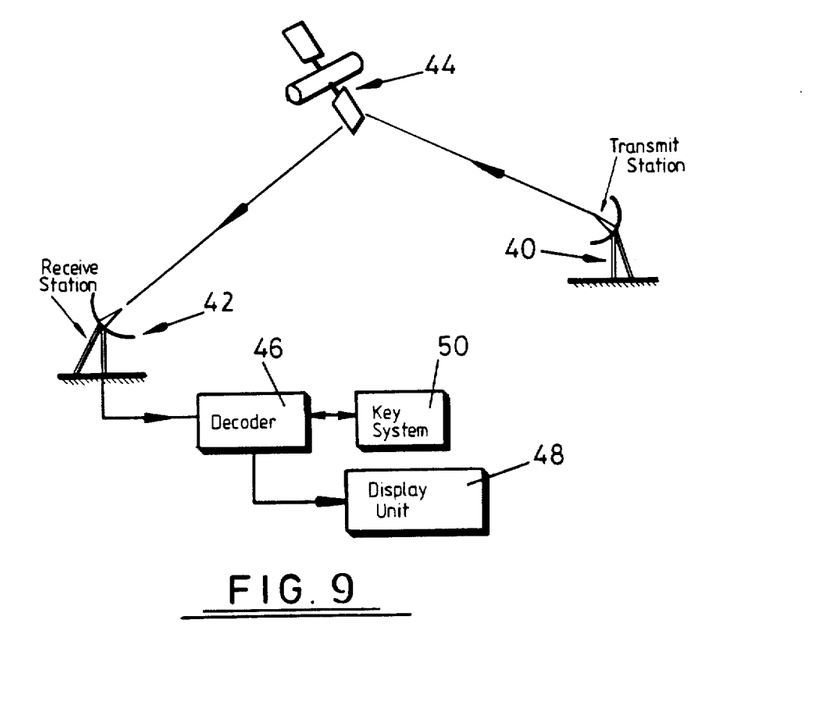

Many applications of the system hereinbefore described are foreseen. Firstly, the system could be used to control instant printing of information at the point of sale or point of use, for example, in a library on-line to a computer or any other means of broadcasting. FIG. 9 depicts a diagrammatic application of the system applied to satellite transmission of information. Because satellite communication channels can handle large volume of data transmission at high rates of transmission it would be suited for use with the system for control access to the information. The information transmits from ground transmission station 40 to ground receiving station 42 via satellite 44 is passed to a decoder 46 associated with a display unit 48. A key unit 50 such as hereinbefore described is coupled to the decoder and information transmitted over the satellite link cannot be accessed until the user obtains 'key codes', which provides control of access to the information and its use as aforedescribed. The key could be on a smart card for example and could be used to 'buy' and monitor units of information received. The card could contain 1000 'information units' and a new code is required each time the card is used, for example for each 20 information units.

Also one aspect of established prior art is to provide access to information on a remote computer over a telephone connection or other form of communication. Until this invention it has not been possible to control access to information which have been down loaded from the remote computer to a storage device within or attached to the users system and then to allow offline use of this information because there was no means of protecting copyright or charging for use. An improvement on this prior art is to incorporate a key device within the users system to control access to the down loaded information be it data, software or some other type of information. Copies of the information etc. cannot be used unless further key devices have been provided.

Pay as you view TV systems have previously relied on a subscription system which is not equitable or good for marketing. An improvement on the prior art is to fit each TV with a key device which will both control access and monitor the number of access units used. This device could either be incorporated within the TV as for example a smart card reader or a purpose made device on-line between the signal cable and the receiver.

With the publication of music on compact disk the opportunity arises for publishers to provide high quality recorded material for public performance in licensed premises, hotels, restaurants etc.

These special public performance disks would only operate in a modified player which incorporates a key device which must be present to enable the CD to be played. This key device will also control access on a time or other unit basis. This is an improvement on prior art because it provides the user with high quality material and minimises copyright infringement.

The most economical way to reproduce and distribute software is to have a single production step i.e. CD-compact disc with 30/40 programs instead of separate programs no matter what software a vendor or manufacturer wishes to distribute. Large capacity hard cards and CD-ROMS made this process possible, and these can be accessed as required by a secure means of controlling access either to, only these programs which have been purchased, or to providing access to all the software on a use charge basis. This invention allows either of these options and indeed controls access to both purchased software, by preventing use of copies, and to charged use software.

With the vast expansion in the CD ROM and CI (compact disk interactive) markets it is likely that in addition to information, software, and music publishing, other forms of recorded material will be published incorporating both sound and vision for entertainment purposes. Whereas prior art only allowed marketing if this type of good by outright selling or hire, this invention will allow pay as you use where a key device is incorporated within the medium such as disk controller, smart card or chip which transfers the information from CD ROM or CD-I to the presentation device such as a monitor and sound replacion system.

Thus, the system controls access to copyrighted information by controlling the access to, and use of, information down loaded from a remote host via a communications system.

Advantages of the invention are that the purchase of expensive information, for example, computer programs is obviated, and the user is able to have the most up-to-date programs as and when they require it according to their particular budget. The user has flexibility when he uses a program merely obtaining a code at a particular time when it suits him to run the program. It will be understood throughout the specification that information is taken to include computer programs, audio information, and the like.

I claim:

1. A control system for controlling access by a host operating system to a store information stored in divisible form in machine readable media using a unique code, said control system comprising, storage means for storing a plurality of unique codes and corresponding information units, said storage means being normally unreadable by the host operating system, said storage means being coupled to said host operating system via a control device and a unique code obtainable by user, said host operating system having code input means for entering said code into said storage means via said control device, said unique code allowing use of a number of information units stored in said storage means, the number of information units used being monitored by an information units counter of said host operating system, and comparison means for comparing the number of units used with an available total number of units for that unique code to permit continued access to said store of information for said corresponding information units, and security means coupled to said storage means for causing the number of information units corresponding to said unique code rendered subsequently inaccessible by said unique code or previously used codes after all said corresponding information units have been released.

2. A control system as claimed in claim 1 characterised in that said units are rendered subsequently inaccessible by setting said number of units corresponding to said unique code to be set to zero.

3. A control system as claimed in claim 1 characterised in that said units are rendered subsequently inaccessible by recoding each code accessed and comparing the recorded code with a newly entered code so that if a match is found further access is prevented.

4. A control system as claimed in claim 3 characterised in that access is controlled by permitting each code to be repeated a preset number of times after which further access to information units is prevented.

5. A control system as according to claim 1 characterized in that said information units are units of time and said information unit counter is a time clock.

6. A control system according to claim 1 characterised in that said information units are units of data, such as pages of information stored in said storage means.

7. A control system according to claim 1 characterised in that said information stored in machine readable form is a computer program.

8. A control system according to claim 1 characterised in that said information stored in machine readable form is an information database.

9. A control system according to claim 1 characterised in that said storage means is a magnetic disk having a specially formatted track thereon, said track having at least one segment having a plurality of pairs of codes and corresponding information units.

10. A control system as claimed in claim 9 characterised in that there are nine segments on the track with each track having 128 pairs of codes and corresponding time units.

11. A control system according to claim 1 characterized in that said control device is a computer and the code input means to the control device is a keyboard.

12. A control system according to claim 1 characterised in that said storage means is an optical disk (compact disk).

13. A method of controlling access by a host operating system to a store of information stored in divisible form in machine readable media using a unique code said method comprising the steps of, providing a storage means having a plurality of unique codes each with a corresponding number of information units, coupling said storage means to said host operating system, providing a unique code for entry into said host operating system, said unique code being identifiable by said storage means, releasing an information unit corresponding to said code, monitoring a counter of said host operating system, and comparing a counted number of released units with a number of available information units permitting access to said store of information for said corresponding number of information units and, after releasing said number of information units, rendering the number of information units corresponding to said code to be inaccessible.

14. A method as claimed in claim 13 wherein said number of information units is rendered inaccessible by setting the number to zero after they have been released by said code.

15. A method as claimed in claim 13 or claim 14 characterized in that said method includes the step of entering said code into said host operating system via a keyboard.

16. A method according to claim 13 characterized in that said method includes the step of receiving an additional code corresponding to an additional time unit for increasing a period of time for which a computer program is used.

17. A storage device for use with a control system for controlling access by a host operating system to a store of information stored in divisible form in a machine readable media using a unique code, said storage means comprising a storage element having at least one specially formatted area which is unreadable by the host operating system, said area having at least one portion with a plurality of a pair of numbers, each pair having a unique code and a corresponding number of information units, said unique code identifying, when selected, the corresponding number of information units for controlling a counter coupled to the host system to operate until a count corresponding to said number of information units has elapsed.

18. A storage device according to claim 17 characterized in that said storage element is a computer disk having a specially formatted track having at least one segment with pairs of numbers therein, said number of information units being stored in time units.

* * * * *